US012738579B2

(12) United States Patent
Barton et al.

(10) Patent No.: US 12,738,579 B2
(45) Date of Patent: Sep. 15, 2026

(54) METHOD AND SYSTEM FOR A PRISMATIC BATTERY CELL ASSEMBLY

(71) Applicant: GM GLOBAL TECHNOLOGY OPERATIONS LLC, Detroit, MI (US)

(72) Inventors: Luke Barton, Beverly Hills, MI (US); Christopher Schlaupitz, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 616 days.

(21) Appl. No.: 18/319,091

(22) Filed: May 17, 2023

(65) Prior Publication Data

US 2024/0387914 A1 Nov. 21, 2024

(51) Int. Cl.

*H01M 50/209* (2021.01)
*H01M 10/0525* (2010.01)
*H01M 50/296* (2021.01)
*H01M 50/536* (2021.01)

(52) U.S. Cl.

CPC ....... *H01M 50/209* (2021.01); *H01M 50/296* (2021.01); *H01M 50/536* (2021.01); *H01M 10/0525* (2013.01)

(58) Field of Classification Search

CPC ........... H01M 10/0525; H01M 50/103; H01M 50/209; H01M 50/296; H01M 50/516; H01M 50/528; H01M 50/531; H01M 50/536; H01M 50/55; H01M 50/553; Y02E 60/10

See application file for complete search history.

(56) References Cited

U.S. PATENT DOCUMENTS

| | | | | |
|---|---|---|---|---|
| 2020/0274133 | A1* | 8/2020 | Masumura | H01M 50/566 |
| 2024/0170811 | A1* | 5/2024 | Wang | H01M 50/103 |

* cited by examiner

*Primary Examiner* — Daniel S Gatewood
(74) *Attorney, Agent, or Firm* — Quinn IP Law

(57) ABSTRACT

A prismatic battery cell assembly includes a prismatic container having a body portion composed with side portions, a top portion arranged on a first end of the body portion and a bottom portion arranged on a second end of the body portion; a first terminal and a second terminal; and battery cells that are arranged in the prismatic container in a stack. Each of the battery cells has a first current collector that is electrically connected to a first foil and a second current collector that is electrically connected to a second foil. The second terminal is arranged on the second end, and the second foils are joined to the second terminal. The first foils are joined to the prismatic container, and the first terminal is the body portion of the prismatic container.

20 Claims, 2 Drawing Sheets

300
310
320
330
340
350
36
45
47
43
41
48
42
46
44
33
31A
32c
40,41

METHOD AND SYSTEM FOR A PRISMATIC BATTERY CELL ASSEMBLY

INTRODUCTION

DC power sources, such as batteries, are electrochemical devices that may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

A lithium battery is a rechargeable electrochemical device that operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accompanied by a respective current collector. The current collectors of the two electrodes are connected by an external circuit that allows an electric current to pass between the electrodes to electrically balance migration of lithium ions.

A battery may be composed of multiple battery cells that may be connected in series, in parallel, or a combination thereof to provide electric power at a predetermined voltage level. Electrical interconnections between positive and negative terminals of the cells may be accomplished via bus bars and other devices.

SUMMARY

The concepts described herein include an apparatus and associated method for a prismatic battery cell assembly having a prismatic container that is able to be either the positive or negative terminal. The concepts described herein may also include a prismatic battery cell assembly wherein the configuration of a plurality of battery cells contained in the prismatic container reduces or eliminates the need for some bus bars to electrically interconnect the plurality of battery cells.

An aspect of the disclosure may include a prismatic battery cell assembly, including a prismatic container, the prismatic container including a body portion composed with plurality of side portions, a top portion arranged on a first end of the body portion, and a bottom portion arranged on a second end of the body portion; a first terminal and a second terminal; and a plurality of battery cells that are arranged in the prismatic container. The plurality of battery cells are arranged in a stack. Each of the plurality of battery cells has a first current collector that is electrically connected to a first foil and disposed on the first end of the prismatic container and a second current collector that is electrically connected to a second foil and disposed on the second end of the prismatic container. The second terminal is arranged on the second end, and a plurality of the second foils are joined to the second terminal. A plurality of the first foils are joined to the prismatic container, and the first terminal is the body portion of the prismatic container.

Another aspect of the disclosure may include the second terminal being electrically isolated from the prismatic container.

Another aspect of the disclosure may include the plurality of the first foils being joined via a laser weld.

Another aspect of the disclosure may include the plurality of the first foils being joined via an electrically conductive paste.

Another aspect of the disclosure may include the plurality of the first foils being joined via solder.

Another aspect of the disclosure may include the plurality of the second foils being cathodes of the plurality of battery cells and wherein the plurality of the first foils are anodes of the plurality of battery cells.

Another aspect of the disclosure may include the plurality of the second foils being anodes of the plurality of battery cells and the plurality of the first foils being cathodes of the plurality of battery cells.

Another aspect of the disclosure may include the plurality of the first foils being electrically joined proximal to a first end of the prismatic container.

Another aspect of the disclosure may include the plurality of the second foils being electrically joined proximal to a second end of the prismatic container.

Another aspect of the disclosure may include the prismatic container being a rigid walled container that is fabricated from electrically conductive material.

Another aspect of the disclosure may include the bottom portion being assembled onto the first end subsequent to insertion of the plurality of battery cells into the body of the prismatic container.

Another aspect of the disclosure may include the bottom portion being integrated into the prismatic container prior to insertion of the plurality of battery cells into the body of the prismatic container.

Another aspect of the disclosure may include a prismatic battery cell assembly that includes a prismatic container, the prismatic container including a body portion composed with plurality of side portions, a bottom portion arranged on a first end of the body portion, and a top portion arranged on a second end of the body portion; a first terminal and a second terminal; and a plurality of battery cells, the plurality of battery cells being disposed in the prismatic container. The plurality of battery cells are arranged in a stack. Each of the plurality of battery cells has a first current collector electrically connected to a first foil and disposed on the second end of the prismatic container; and each of the plurality of battery cells has a second current collector electrically connected to a second foil and disposed on the second end of the prismatic container. The second terminal is arranged on the second end. A plurality of the second foils are joined to the second terminal, and a plurality of the first foils are joined to the prismatic container on the second end. The first terminal includes the body portion of the prismatic container; and the prismatic container is a rigid walled container that is fabricated from electrically conductive material.

Another aspect of the disclosure may include a method for assembling a prismatic battery cell assembly that includes arranging a plurality of battery cells in a stack, wherein each of the plurality of battery cells has a respective first current collector electrically connected to a first foil and wherein each of the plurality of battery cells has a respective second current collector electrically connected to a second foil; inserting the plurality of battery cells into a prismatic container, wherein the prismatic container includes a body portion composed with plurality of side portions, a bottom portion arranged on a first end of the body portion, and a top portion arranged on a second end of the body portion; joining the second foils of the plurality of battery cells to a second terminal; and joining the first foils of the plurality of battery cells to the prismatic container; wherein the prismatic container is the first terminal.

Another aspect of the disclosure may include joining the first foils of the plurality of battery cells to the prismatic container by laser welding the first foils of the plurality of battery cells to the prismatic container.

Another aspect of the disclosure may include joining the first foils of the plurality of battery cells to the prismatic container by soldering the first foils of the plurality of battery cells to the prismatic container.

Another aspect of the disclosure may include joining the first foils of the plurality of battery cells to the prismatic container by joining, via a conductive adhesive, the first foils of the plurality of battery cells to the prismatic container.

The above summary is not intended to represent every possible embodiment or every aspect of the present disclosure. Rather, the foregoing summary is intended to illustrate some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
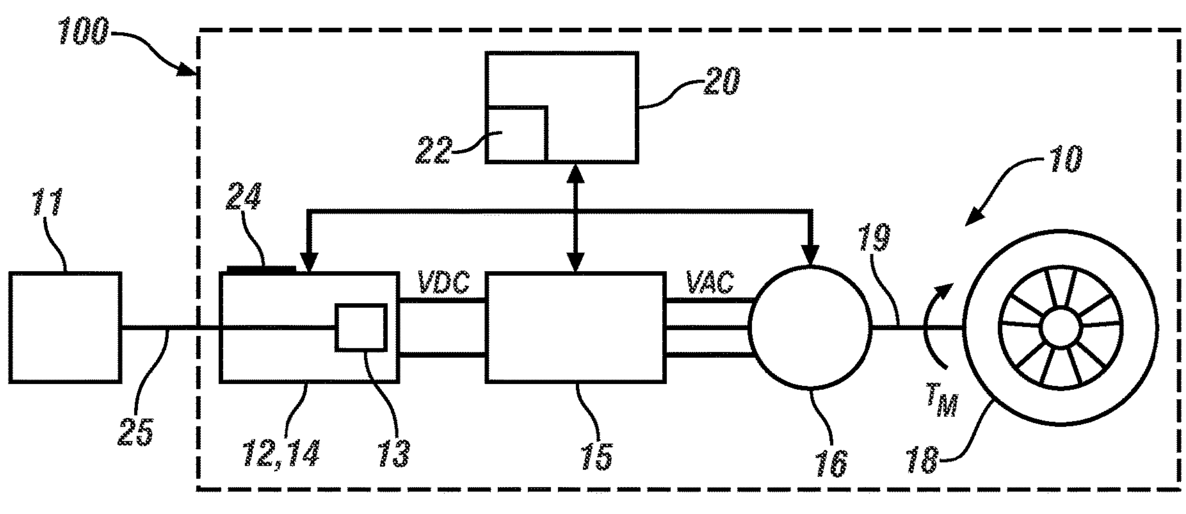
FIG. 1 schematically illustrates an electrified drivetrain for a vehicle including a rechargeable energy storage system and charging system, in accordance with the disclosure.

The appended drawings are not necessarily to scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is illustrative in nature and is not intended to limit the application and uses. Furthermore, there is no intention to be bound by any expressed or implied theory presented herein. Throughout the drawings, corresponding reference numerals indicate like or corresponding parts and features.

Referring to the drawings, wherein like reference numerals correspond to like or similar components, FIG. 1 schematically illustrates elements related to a vehicle 100 including an electrified drivetrain 10 and a rechargeable energy storage system (RESS) 12, which is couplable via power cord and connector 25 to an electric power supply 11 via a charger 13. The vehicle 100 may include, but is not limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

The electric power supply 11 is coupled to an electric power source originating from a public or a private electric power supplier, and is arranged to channel electric power via the power cord and connector 25 to the RESS 12 via the charger 13 when the vehicle 100 is stationary. The electric power may be delivered at nominal voltage levels of 120 VAC, 240 VAC, 360 VAC, 480 VAC, or another voltage level without limitation. The power cord and connector 25 may be an Electric Vehicle Supply Equipment (EVSE) device, or another device, without limitation.

The electrified drivetrain 10 may be an electric drivetrain that employs only electrical devices to generate tractive power, such as electric motor/generators. Alternatively, the electrified drivetrain 10 may be a hybrid electric drivetrain that employs multiple devices to generate electric power and/or tractive torque, such as an internal combustion engine or a fuel cell, for example.

As illustrated, the electrified drivetrain 10 includes the RESS 12, power inverter 15, an electric machine 16, and a drive wheel 18. The RESS 12 is electrically coupled to and provides electrical energy (VDC) to one or more power sources, such as the electric machine 16, via the power inverter 15. The electric machine 16 provides tractive torque ($T_M$) 19 to the drive wheel 18.

The RESS 12 is composed of one or a plurality of battery cell module assemblies (BCMA) 14, one of which is illustrated with reference to FIG. 2.

The RESS 12 is connected to the charger 13, which includes a charging inlet port into which the connector 25 may be plugged for purposes of charging the RESS 12 when the vehicle 100 is stationary. The charger 13 is an electric device that is controllable by a DC current fast charge (DCFC) control routine 22 that is executed by a controller 20 to manage electric power flow to the RESS 12.

The controller 20 is arranged to monitor the RESS 12, the power inverter 15, and the electric machine 16.

The controller 20 also includes a non-transitory digital data storage medium on which a control routine 22 is stored in one or multiple encoded datafiles that are executable by a processor of the controller 20. An embodiment of the control routine 22 is described with reference to FIG. 2.

The controller 20 may also include control routines for monitoring and controlling operations of the power inverter 15 and the electric machine 16.

One or multiple heat exchangers 24 may be in thermal contact with the RESS 12 and the inverter 15 to effect heat transfer.

Figure 2:
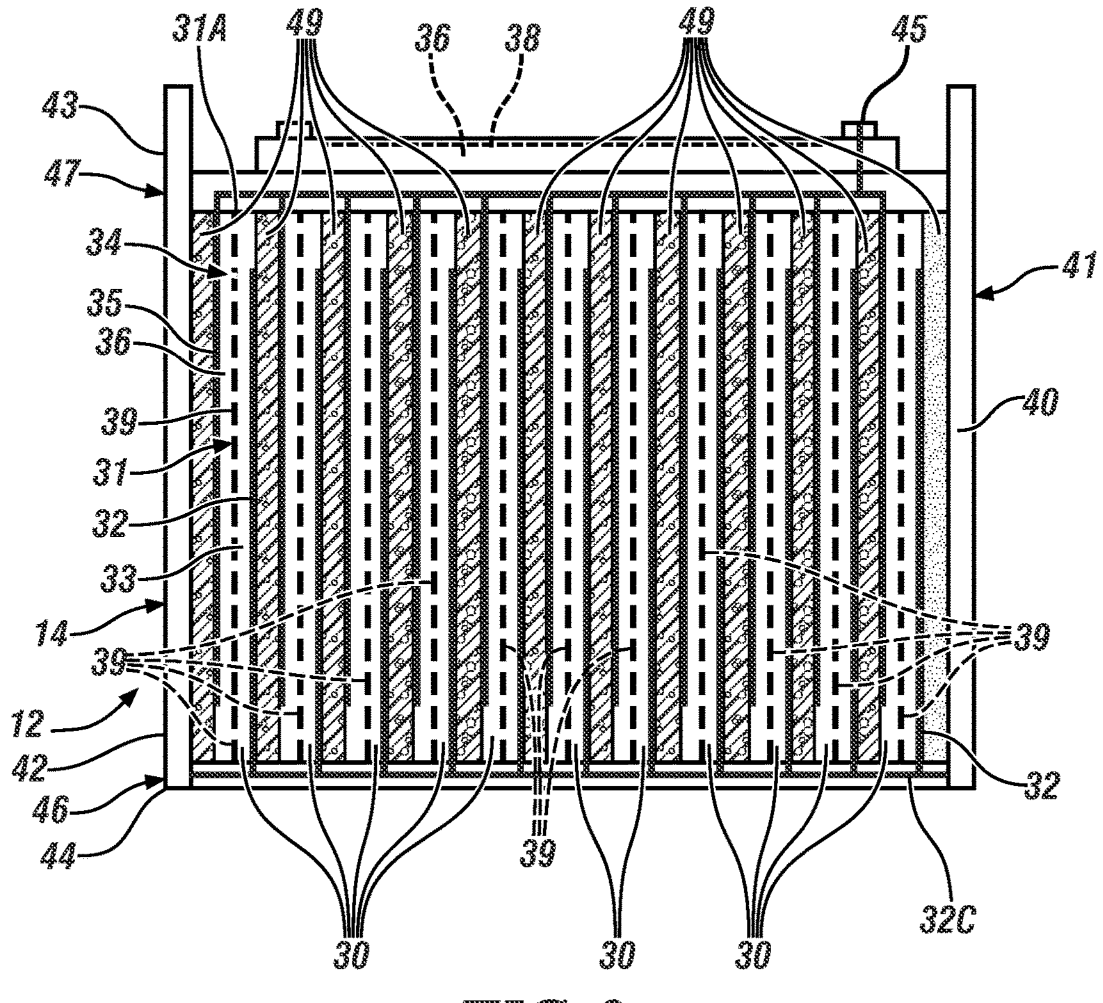
FIG. 2 schematically illustrates a cutaway side view of a battery module for a rechargeable energy storage system, in accordance with the disclosure.

FIG. 2 is a cutaway sideview of one of the BCMAs 14 included in the RESS 12 of FIG. 1. The BCMA 14 includes a plurality of battery cells 30 that are arranged in a stack in a prismatic container 40.

The prismatic container 40 is composed of a prismatic body 41, a bottom portion 42, and a top portion 43. The prismatic container 40 has a first end 46 and a second end 47, wherein the bottom portion 42 is disposed at the first end 46, and the top portion 43 is disposed at the second end 47. The prismatic container 40 may be fabricated from aluminum, titanium, stainless steel, or another electrically conductive material.

The prismatic container 40 includes a first terminal 44 that is electrically connected to the prismatic body 41, including, in one embodiment, the bottom portion 42 thereof. Alternatively, the first terminal 44 is composed as the prismatic body 41 excluding the bottom portion 42 thereof. In both embodiments, the prismatic body 41, or the prismatic body 41 in conjunction with the bottom portion 42 is the first terminal 44. In one embodiment, the first terminal 44 is a negative terminal, i.e., an anode. Alternatively, the first terminal 44 is a positive terminal, i.e., a cathode.

The second terminal 45 is arranged as a raised tab on the top portion 43 of the container 40 and is electrically isolated from the container 40. The second terminal 45 is electrically connected to a cathode interconnect 31A in one embodiment. In one embodiment, the second terminal 45 is a positive terminal, i.e., a cathode. Alternatively, the second terminal 45 is a negative terminal, i.e., an anode.

In one embodiment, each of the battery cells 30 is configured as an elongated rectangular prismatic device, and each battery cell 30 is configured as pouch-type device. Alternatively, each battery cell 30 is configured as a solid-state device.

Each of the battery cells 30 includes an anode 31, a cathode 34, and an interposed separator 39. Each of the anodes 31 includes an anode current collector 32 and an anode foil 33. Each of the cathodes 34 includes a cathode current collector 35 and a cathode foil 36. One of the anodes 31 and anode current collectors 32 is indicated, and one of the cathodes 34 and cathode current collectors 35 is designated. The separator 39 is a porous polymer separator that is soaked with an electrolyte solution suitable for conducting lithium ions.

An insulative layer 49 may be arranged to separate the adjacent battery cells 30. The battery cells 30 may be connected in series, in parallel, or a combination thereof, via the anode interconnect device 32C and the cathode interconnect device 31A. Adjacent battery cells 30 may be stacked against one another in a vertical stack, or may be separated by air gaps or the insulative layer 49, for example.

The BCMA 14 includes a cell monitoring unit 38 that has a printed circuit board (represented in phantom) configured to monitor one or more parameters of the battery cells 30. The anode and cathode interconnect devices 32C. 31A may be disposed between the plurality of battery cells 30 and the cell monitoring unit 38, and may include components that physically connect the plurality of battery cells 30 with the cell monitoring unit 38 and the printed circuit board thereon. Container 40 may enclose the battery cells 30 of the BCMA 14.

The plurality of battery cells 30 are arranged in a stack, with the anode foils 33 thereof projecting from the first end 46 and electrically joined via the anode interconnect device 32C. The anode interconnect device 32C is electrically joined to the container 40.

The cathode foils 36 of the plurality of battery cells 30 project from a second end 47 and are electrically joined via the cathode interconnect device 31A. The cathode interconnect device 31A is electrically joined to the second terminal 45, which is mechanically connected but electrically isolated from the top portion 43 that is arranged on the second end 47.

In one embodiment, each of the battery cells 30 is a rechargeable lithium-metal or lithium-ion (lithium) battery cell. A lithium battery generally operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode.

During a discharge process, lithium active particles diffuse up to a surface of the cathode where they react, producing lithium ions that flow through an electrolyte solution via diffusion and migration until they arrive at the cathode. The positively charged ions react with the metal oxide material particles of the anode and diffuse within it. The electrons produced in the cathode reaction cannot flow through the electrolyte solution that acts as insulator and flow through an external circuit, producing electrical current. The inverse reactions occur during a charge process. Battery cell parameters include voltage, current, temperature, etc.

The controller 20 is arranged to monitor the RESS 12, and includes communication links to the anode current collector 32 and the cathode current collector 35 for monitoring parameters of the battery cells 30 of the RESS 12, communication links to the inverter 15, and communication links to the electric machine 16.

The controller 20 also includes a non-transitory digital data storage medium on which a battery management control routine 22 is stored in one or multiple encoded datafiles that are executable by a processor of the controller 20.

As previously described, the battery cell 30 includes a container 40 having a first terminal 44 that is electrically connected to the cathode interconnect device 31A and a second terminal 45 that is electrically connected to the cathode interconnect device 31A in one embodiment.

The second terminal 45 is arranged as a raised tab on a top portion 43 of the container 40 and is electrically isolated from the container 40, and the first terminal 44 is composed as the prismatic body 41, including, in one embodiment, the bottom portion 42 thereof. Alternatively, the first terminal 44 is composed as the prismatic body 41 excluding the bottom portion 42 thereof.

Alternatively, the first terminal 44 is electrically connected to the cathode current collector 35 and the second terminal 45 is electrically connected to the anode current collector 32.

The container 40 is arranged as a rectangular prismatic container including the prismatic body 41 that is composed with plurality of planar-shaped side portions 48, top portion 43 that is arranged on a first end 46 of the prismatic body 41, and bottom portion 42 arranged on a second end 47 of the prismatic body 41.

The plurality of battery cells 30 are arranged in a stack with each of the plurality of battery cells 30 having a first current collector, e.g., anode current collector 32, and a second current collector, e.g., cathode current collector 35.

A plurality of the second current collectors 35 are disposed on the second end 47 of the prismatic container 40 and are electrically connected to the second terminal 45 via a cathode interconnect device 31A.

A plurality of the first current collectors 32 are disposed on the first end 46 of the prismatic container 40 and are electrically connected to the prismatic container 40 to form the first terminal 44. In one embodiment, the plurality of the first current collectors 32 are joined via an anode interconnect device 32C that is electrically connected to the prismatic container 40.

The second terminal 45 is electrically isolated from the prismatic container.

The plurality of the second foils 36 are joined via a laser weld in one embodiment. Alternatively, the plurality of the second foils 36 are joined via an electrically conductive paste, in one embodiment. Alternatively, the plurality of the second foils 36 being joined via solder in one embodiment.

The plurality of the first foils 33 are cathodes of the plurality of battery cells and the plurality of the second foils 36 are anodes of the plurality of battery cells in one embodiment.

Alternatively, the plurality of the first foils 33 are anodes of the plurality of battery cells and the plurality of the second foils 36 are cathodes of the plurality of battery cells in one embodiment.

The plurality of the first foils 33 are electrically joined proximal to a first end 46 of the prismatic container 40.

The plurality of the second foils 36 are electrically joined proximal to a second end 47 of the prismatic container 40.

The prismatic container 40 is a rigid walled container that is fabricated from electrically conductive material.

The plurality of the second foils 36 are anodes of the plurality of battery cells, in one embodiment.

The plurality of the second foils 36 are cathodes of the plurality of battery cells, in one embodiment.

The bottom portion 42 is assembled onto the first end 46 subsequent to insertion of the plurality of battery cells 30 into the body 41 of the prismatic container 40 in one embodiment. Alternatively, the bottom portion 42 is integrated into the prismatic container 40 prior to insertion of the plurality of battery cells 30 into the body 41 of the prismatic container 40.

Figure 3:
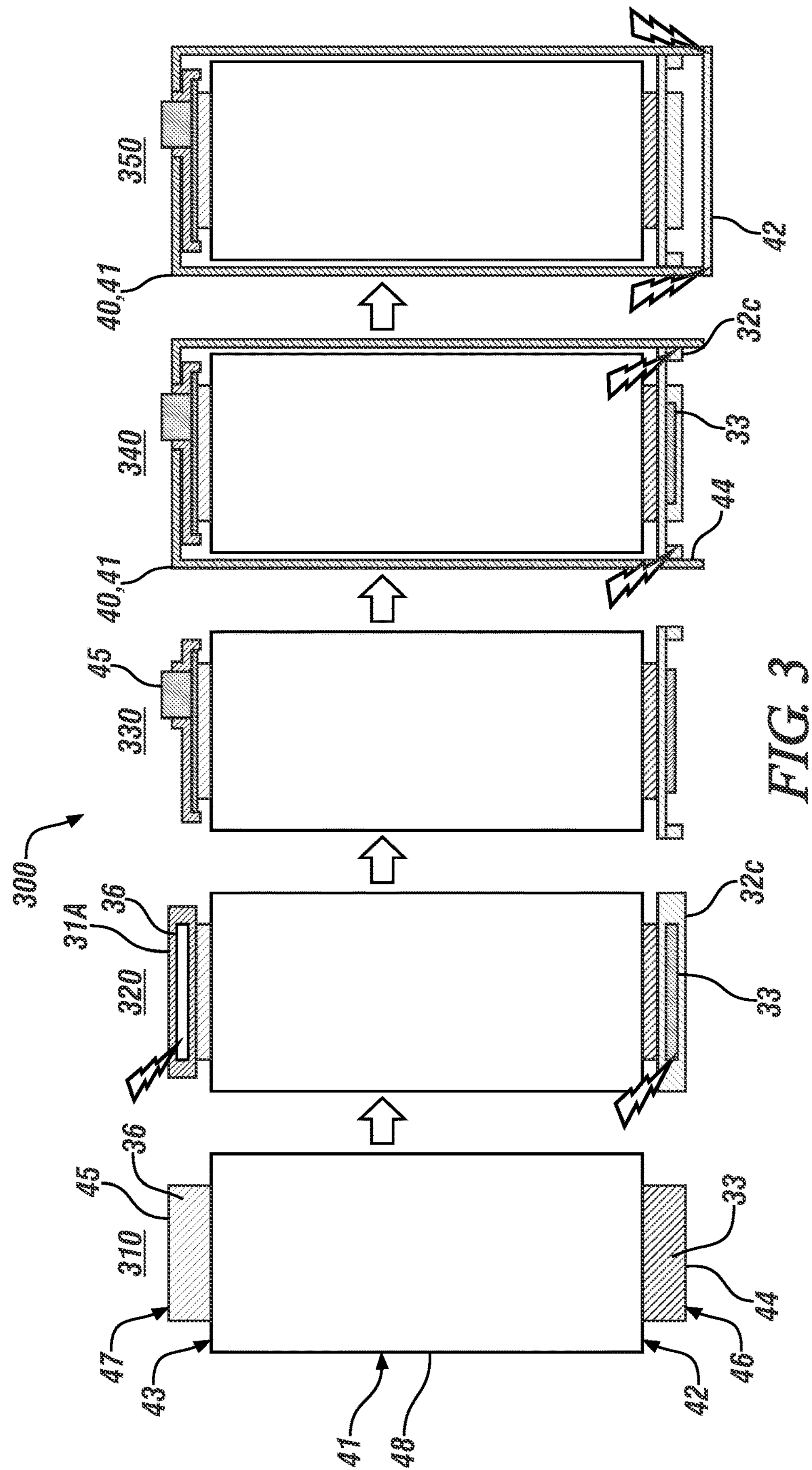
FIG. 3 schematically illustrates a process for assembling an embodiment of the battery module described with reference to FIG. 2, in accordance with the disclosure.

FIG. 3 schematically illustrates details related to a process 300 for assembling an embodiment of the BCMA 14 that includes a plurality of battery cells 30 described with reference to FIG. 2. A side view of one of the battery cells 30 is shown, and includes anode foil 33 arranged on the first end 46 and cathode foil 36 arranged on the second end 47.

Initially, the plurality of battery cells 30 are arranged in a stack, with respective plurality of first foils, e.g., anode foils 33, projecting from the first end 46, and respective plurality of second foils, e.g., cathode foils 36, projecting from the second end 47 (Step 310).

The plurality of first foils, e.g., anode foils 33, are mechanically and electrically joined by a joining process, with the joining process being a laser welding process in one embodiment. Alternatively, the joining process is a soldering process. Alternatively, the joining process includes applying a conductive paste between the anode foils 33. In one embodiment, the joining process includes joining the plurality of first foils, e.g., anode foils 33, employing an anode interconnect device 32C.

In like manner, the plurality of second foils, e.g., cathode foils 36, are mechanically and electrically joined by a joining process, with the joining process being a laser welding process in one embodiment. Alternatively, the joining process is a soldering process. Alternatively, the joining process includes applying a conductive paste. In one embodiment, the joining process includes joining the plurality of second foils, e.g., cathode foils 36, employing a cathode interconnect device 31A (Step 320).

The anode interconnect device 32C and the cathode interconnect device 31A may be folded (Step 330).

The joined plurality of battery cells 30 are inserted into the prismatic body 41 of the container 40. The first foils 33 of the plurality of battery cells 30 are joined to the prismatic container 40, via welding, soldering, or conductive paste, and form the first terminal 44. The second foils 36 of the plurality of battery cells 30 are joined to a second terminal 45 that projects from or is accessible through the top portion 43 of the container 40 (Step 340).

The bottom portion 42 is joined to the prismatic body 41 of the container 40 via laser welding, soldering, or conductive paste (Step 350).

The concepts described herein provide a design for a prismatic can cell that uses the metal enclosure as a conduction path and/or electrical terminal. This may be accomplished using an electrode stack that is inserted into a prismatic can cell. The electrode stack/roll has its cathode/anode foils welded to interconnects. After being welded the interconnects may be folded into assembly-position. The top interconnect is designed with the terminal integrated or with the ability to integrate to a terminal. The bottom interconnect is designed to be welded to the inside side walls of the prismatic can enclosure. The metal can would then be assembled over the electrode stack assembly. The bottom interconnect would be welded to the inside of the metal can followed by a bottom cap being welded to close/seal the metal can. Following this, a fill, evacuation, and formation process may be used in the remaining cell processing and manufacturing.

This arrangement may reduce current density gradient within electrodes for long aspect-ratio prismatic can cells with electrical terminals on the same side by keeping electrode tabs on opposite ends, which may result in more uniform heat generation and cell aging.

This arrangement may also eliminate a need for cell busbars and terminals, thus reducing mass, part numbers, device complexity and package space.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A prismatic battery cell assembly, comprising:
- a prismatic container, the prismatic container including a body portion composed with plurality of side portions, a bottom portion arranged on a first end of the body portion, and a top portion arranged on a second end of the body portion;
- a first terminal and a second terminal; and
- a plurality of battery cells, the plurality of battery cells being disposed in the prismatic container;
- wherein the plurality of battery cells are arranged in a stack;
- wherein each of the plurality of battery cells has a first current collector electrically connected to a first foil and disposed on the first end of the prismatic container;
- wherein each of the plurality of battery cells has a second current collector electrically connected to a second foil and disposed on the second end of the prismatic container;
- wherein the second terminal is arranged on the second end;
- wherein a plurality of the second foils are joined to the second terminal;
- wherein a plurality of the first foils are joined to the prismatic container; and
- wherein the first terminal comprises the body portion of the prismatic container.

2. The prismatic battery cell assembly of claim 1, wherein the second terminal is electrically isolated from the prismatic container.

3. The prismatic battery cell assembly of claim 1, wherein the plurality of the first foils are joined via a laser weld.

4. The prismatic battery cell assembly of claim 1, wherein the plurality of the first foils are joined via an electrically conductive paste.

5. The prismatic battery cell assembly of claim 1, wherein the plurality of the first foils are joined via solder.

6. The prismatic battery cell assembly of claim 1, wherein the plurality of the second foils comprise cathodes of the plurality of battery cells and wherein the plurality of the first foils comprise anodes of the plurality of battery cells.

7. The prismatic battery cell assembly of claim 1, wherein the plurality of the second foils comprise anodes of the plurality of battery cells and wherein the plurality of the first foils comprise cathodes of the plurality of battery cells.

8. The prismatic battery cell assembly of claim 1, wherein the plurality of the first foils are electrically joined proximal to a first end of the prismatic container.

9. The prismatic battery cell assembly of claim 1, wherein the plurality of the second foils are electrically joined proximally to a second end of the prismatic container.

10. The prismatic battery cell assembly of claim 1, wherein the prismatic container comprises a rigid walled container that is fabricated from electrically conductive material.

11. The prismatic battery cell assembly of claim 1, wherein the bottom portion being arranged on the first end of the prismatic container comprises the bottom portion being assembled onto the first end of the prismatic container subsequent to an insertion of the plurality of battery cells into the body of the prismatic container.

12. The prismatic battery cell assembly of claim 1, wherein the bottom portion being arranged on the first end of the prismatic container comprises the bottom portion being integrated into the prismatic container prior to insertion of the plurality of battery cells into the body of the prismatic container.

13. A prismatic battery cell assembly, comprising:
- a prismatic container, the prismatic container including a body portion composed with plurality of side portions, a bottom portion arranged on a first end of the body portion, and a top portion arranged on a second end of the body portion;
- a first terminal and a second terminal; and
- a plurality of battery cells, the plurality of battery cells being disposed in the prismatic container;
- wherein the plurality of battery cells are arranged in a stack;

wherein each of the plurality of battery cells has a first current collector electrically connected to a first foil and disposed on the second end of the prismatic container;

wherein each of the plurality of battery cells has a second current collector electrically connected to a second foil and disposed on the second end of the prismatic container;

wherein the second terminal is arranged on the second end;

wherein a plurality of the second foils are joined to the second terminal;

wherein a plurality of the first foils are joined to the prismatic container on the second end;

wherein the first terminal comprises the body portion of the prismatic container; and wherein the prismatic container comprises a rigid walled container that is fabricated from electrically conductive material.

14. The prismatic battery cell assembly of claim 13, wherein the second terminal is electrically isolated from the prismatic container.

15. The prismatic battery cell assembly of claim 13, wherein the plurality of the first foils are joined via one of a laser weld, an electrically conductive paste, or solder.

16. The prismatic battery cell assembly of claim 13, wherein the plurality of the first foils are electrically joined proximal to a first end of the prismatic container and the plurality of the second foils are electrically joined proximal to a second end of the prismatic container.

17. A method for assembling a prismatic battery cell assembly, comprising:

arranging a plurality of battery cells in a stack, wherein each of the plurality of battery cells has a respective first current collector electrically connected to a first foil and wherein each of the plurality of battery cells has a respective second current collector electrically connected to a second foil;

inserting the plurality of battery cells into a prismatic container, wherein the prismatic container includes a body portion composed with plurality of side portions, a bottom portion arranged on a first end of the body portion, a top portion arranged on a second end of the body portion, and wherein the prismatic container comprises a first terminal;

joining the second foils of the plurality of battery cells to a second terminal; and joining the first foils of the plurality of battery cells to the prismatic container.

18. The method of claim 17, wherein joining the first foils of the plurality of battery cells to the prismatic container comprises laser welding the first foils of the plurality of battery cells to the prismatic container.

19. The method of claim 17, wherein joining the first foils of the plurality of battery cells to the prismatic container comprises soldering the first foils of the plurality of battery cells to the prismatic container.

20. The method of claim 17, wherein joining the first foils of the plurality of battery cells to the prismatic container comprises joining, via a conductive adhesive, the first foils of the plurality of battery cells to the prismatic container.

* * * * *